US012418569B2

(12) United States Patent
Jerichow et al.

(10) Patent No.: US 12,418,569 B2
(45) Date of Patent: Sep. 16, 2025

(54) NETWORK MANAGEMENT

(71) Applicant: Nokia Technologies OY, Espoo (FI)

(72) Inventors: Anja Jerichow, Grafing bei Muenchen (DE); Genevieve Mange, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 270 days.

(21) Appl. No.: 17/769,501

(22) PCT Filed: Oct. 15, 2020

(86) PCT No.: PCT/EP2020/078985
§ 371 (c)(1),
(2) Date: Apr. 15, 2022

(87) PCT Pub. No.: WO2021/074266
PCT Pub. Date: Apr. 22, 2021

(65) Prior Publication Data
US 2023/0129885 A1    Apr. 27, 2023

(30) Foreign Application Priority Data
Oct. 16, 2019  (EP) .................................. 19203604

(51) Int. Cl.
| H04L 9/10 | (2006.01) |
| H04L 9/40 | (2022.01) |
| H04L 67/14 | (2022.01) |
| H04W 12/106 | (2021.01) |
| H04W 56/00 | (2009.01) |

(52) U.S. Cl.
CPC .................................. *H04L 63/20* (2013.01)

(58) Field of Classification Search
CPC ...................................................... H04L 63/20
See application file for complete search history.

(56) References Cited

U.S. PATENT DOCUMENTS

| 11,943,145 | B2* | 3/2024 | Rost ........................ H04L 67/60 |
| 2018/0227302 | A1 | 8/2018 | Lee et al. |
| 2019/0068625 | A1 | 2/2019 | Alfano et al. |
| 2021/0067958 | A1* | 3/2021 | Lee ..................... H04W 12/106 |
| 2021/0168594 | A1* | 6/2021 | Wu ........................ H04W 88/16 |
| 2021/0219357 | A1* | 7/2021 | Talebi Fard ............ H04L 67/14 |
| 2021/0359778 | A1* | 11/2021 | Wang ..................... H04W 76/12 |
| 2022/0078662 | A1* | 3/2022 | Wang .................... H04M 15/66 |
| 2022/0124488 | A1* | 4/2022 | Tsiatsis ............... H04W 12/033 |
| 2022/0216932 | A1* | 7/2022 | Wang ................ H04W 56/0015 |

FOREIGN PATENT DOCUMENTS

| CN | 109600803 A | 4/2019 |
| WO | 2018/167307 A1 | 9/2018 |

OTHER PUBLICATIONS

Examination Report for Indian Application No. 202247027094 dated Sep. 1, 2022 and English translation.
(Continued)

*Primary Examiner* — Oleg Survillo
(74) *Attorney, Agent, or Firm* — Harness, Dickey & Pierce, P.L.C.

(57) ABSTRACT

The apparatus includes a memory configured to store security information, and at least one processing core, configured to generate the security information by defining a security policy concerning user plane transfer of precision time protocol messages, and to instruct at least one network node to implement the security policy by transmitting the security information to the at least one network node.

20 Claims, 5 Drawing Sheets

(56) References Cited

OTHER PUBLICATIONS

"3rd Generation Partnership Project; Technical Specification Group Services and System Aspects; Study on security for 5GS enhanced support of Vertical and LAN Services; (Release 16)", Oct. 7, 2019 (Oct. 7, 2019), XP051810845, Retrieved from the Internet <URL: https://ftp.3gpp.org/tsg_sa/WG3_Security/TSGS3_96AH_Chongqing/Docs/S3-193523.zip S3-193523 TR 33.819 update.doc> [retrieved on Oct. 7, 2019].
Tencent: "PDU Session Establishment for TSC", vol. SA WG2, no. Sapporo, Japan; Jun. 24, 2019-Jun. 28, 2019, Jun. 18, 2019 (Jun. 18, 2019), XP051752505, Retrieved from the Internet <URL:http://www.3gpp.org/ftp/tsg%5Fsa/WG2%5FArch/TSGS2%5F134%5FSapporo/Docs/S2%2D1907547%2Ezip> [retrieved on Jun. 28, 2019].
International Search Report for International Application No. PCT/EP2020/078985 dated Dec. 1, 2020.
Chinese Office Action and Search Report dated Jul. 5, 2024 issued in Chinese Patent Application No. 2020800833146.
3rd Generation Partnership Project; Technical Specification Group Services and System Aspects; Study on security for 5GS enhanced support of Vertical and LAN Services; Release 16, 3GPP TR 33.819 V1.2.3 (2019).
Tencent, PDU Session Establishment for TSC, 3GPP, S2-1907547, pp. 1-22 (2019).
Office Action dated Oct. 2, 2024 issued in European Patent Application No. 20789175.5.

* cited by examiner

NETWORK MANAGEMENT

CROSS-REFERENCE TO RELATED APPLICATIONS

This application is a national phase under 35 U.S.C. § 371 of PCT International Application No. PCT/EP2020/078985 which has an International filing date of Oct. 15, 2020, which claims priority to European Patent Application No. 19203604.4, filed Oct. 16, 2019, the entire contents of each of which are hereby incorporated by reference.

FIELD

The present disclosure relates to management of communication networks.

BACKGROUND

Communication across one or more communication systems may be divided into differing traffic classes. For example, conversational telephone calls may have stricter latency requirements than software updates performed in the background, without the user even noticing they are going on.

Different communication systems and networks have different mechanisms in place to enforce traffic rules to provide to users the kind of performance the systems have been designed to provide. Likewise, different communications systems have differing methods to handle timing.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising a memory configured to store security information, and at least one processing core, configured to generate the security information by defining a security policy concerning user plane transfer of precision time protocol messages, and to instruct at least one network node to implement the security policy by transmitting the security information to the at least one network node.

According to a second aspect of the present disclosure, there is provided a method comprising storing security information, generating the security information by defining a security policy concerning user plane transfer of precision time protocol messages, and instructing at least one network node to implement the security policy by transmitting the security information to the at least one network node.

According to a third aspect of the present disclosure, there is provided an apparatus comprising means for storing security information, generating the security information by defining a security policy concerning user plane transfer of precision time protocol messages, and instructing at least one network node to implement the security policy by transmitting the security information to the at least one network node.

According to a fourth aspect of the present disclosure, there is provided a non-transitory computer readable medium having stored thereon a set of computer readable instructions that, when executed by at least one processor, cause an apparatus to at least store security information, generate the security information by defining a security policy concerning user plane transfer of precision time protocol messages, and instruct at least one network node to implement the security policy by transmitting the security information to the at least one network node.

According to a fifth aspect of the present disclosure, there is provided a computer program configured to cause an apparatus to perform at least the following: storing security information, generating the security information by defining a security policy concerning user plane transfer of precision time protocol messages, and instructing at least one network node to implement the security policy by transmitting the security information to the at least one network node.

EMBODIMENTS

In accordance with the present disclosure, a network apparatus, such as an apparatus performing as a session management function, may set a security policy for user plane transfer of time protocol messages, such as precision time protocol messages. This may take place when a communication system where the network apparatus is comprised is configured to act as a logical bridge for time sensitive networking, the logical bridge being between two time-aware systems. The network apparatus may be configured to set the security policy to require integrity protection, confidentiality protection or both integrity protection and confidentiality protection. Setting the protection(s) benefits the reliability of timekeeping provided by the time protocol messages, since tampering with them is controlled. The network apparatus may be configured to set the security policy based on a trigger from a time sensitive networking adaptor function, or based on a determination that a message the network apparatus receives is from a time sensitive communication application function. The network apparatus may set the security policy by transmitting security information defining the security policy to a base station node, such as a gNB, for example. The base station node is thereby instructed to implement the security policy.

Figure 1:
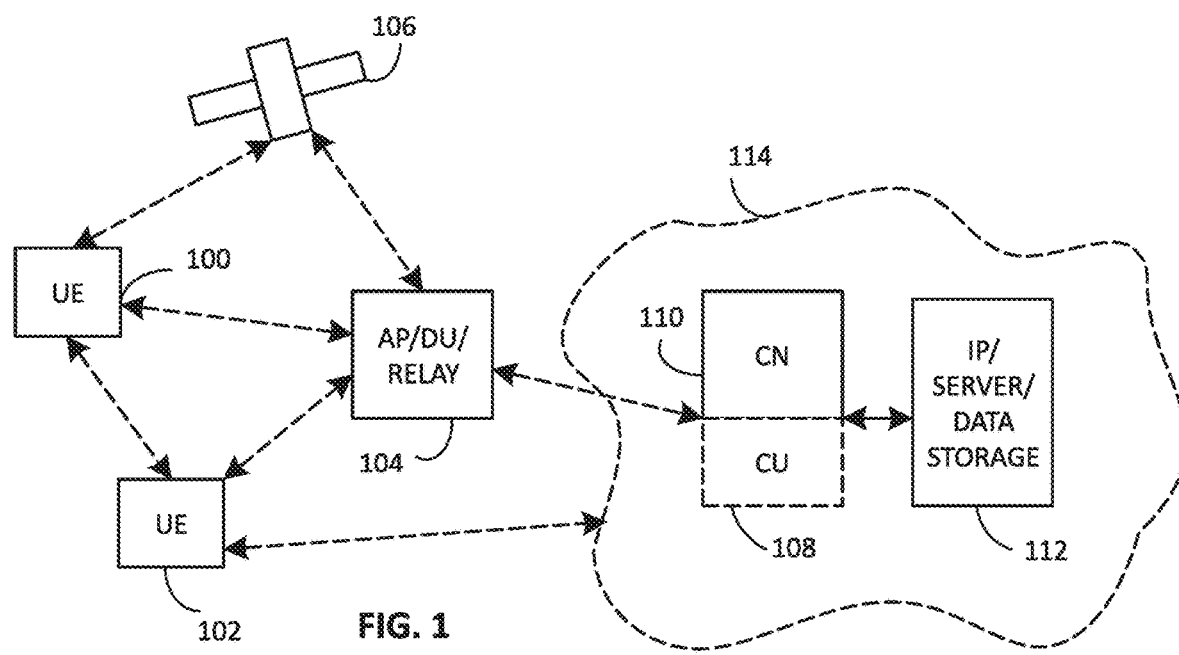
FIG. 1 illustrates an example system usable in accordance with at least some embodiments of the present invention.

FIG. 1 illustrates an example system in usable accordance with at least some embodiments. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is known for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. FIG. 1 depicts examples of simplified system architectures only showing some elements and functional entities, all being logical units, whose implementation may differ from what is shown. The connections shown in FIG. 1 are logical connections; the actual physical connections may be different. The system may comprise also other functions and structures than those shown in FIG. 1.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of the communication system it is coupled to. The NodeB may also be referred to as a base station, an access point or any other type of interfacing device including a relay station such as DU (distributed unit) part of IAB (integrated access and backhaul) node capable of operating in a wireless environment. The DU part may facilitate the gNB functionalities of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB 104 is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such scenario is MT (mobile termination) part of IAB node, which provides the backhaul connection for the IAB node.

Additionally, although the apparatuses have been depicted as single entities or functions, different units, processors and/or memory units (not all shown in FIG. 1) may be implemented inside these apparatuses, to enable the functioning thereof.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The system may act as a bridge between further systems. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

The system may comprise a plurality of (e/g)NodeBs, the user device may have an access to a plurality of radio cells and the system may comprise also other apparatuses, such as physical layer relay nodes or other network elements. A cellular radio system may be implemented as a multilayer network including several kinds of cells, such as macrocells, microcells and picocells, for example. Typically, in multilayer networks, one access node provides one kind of a cell or cells, and thus a plurality of (e/g)NodeBs are required to provide such a network structure. A gNodeB may be expressed more concisely as gNB.

Figure 2A:
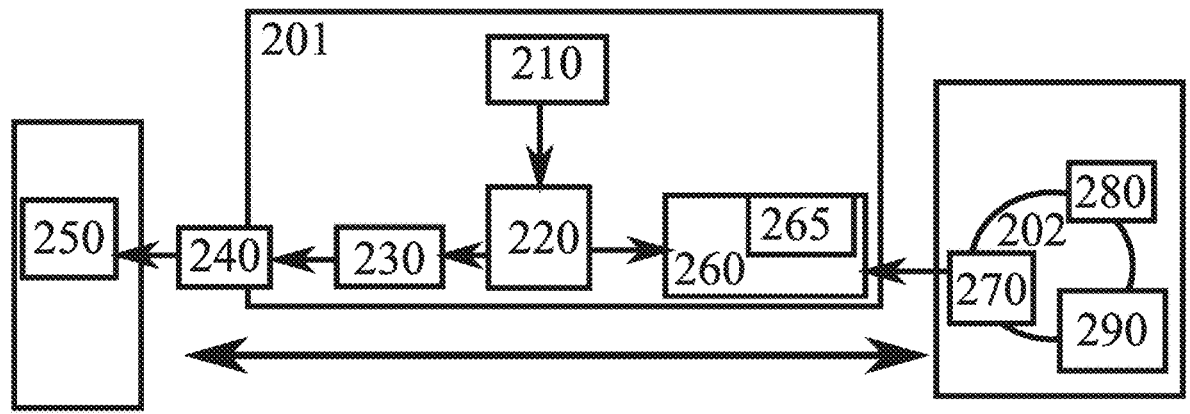
FIG. 2A illustrates an example system in accordance with at least some embodiments of the present invention.

FIG. 2A illustrates an example system usable in accordance with at least some embodiments of the present invention. 5G time domain 201 comprises a 5G system clock 210, which provides synchronization to gNB 220, user equipment, UE, 230, device-side time-sensitive networking translator DS-TT 240, user-plane function UPF 260 and a network-side time-sensitive networking translator NW-TT 265 comprised in the UPF 260. The DS-TT 240 may be, at least in part or in whole, comprised in UE 230. gNB 220 is a base station of the 5G system and comprised in a radio access network, RAN, which may comprise several base stations. A separate time sensitive networking, TSN, working domain 202 is interfaced with UPF 260. This domain comprises a TSN bridge 270, a TSN grandmaster clock 280 and an end station 290. A device-side TSN end station 250 is disposed on the other side of the 5G system, such that the 5G system acts as a bridge between the TSN end station 250 and TSN working domain 202. The translators DS-TT and NW-TT serve the purpose of concealing the internal functioning of the 5G system from the TSN systems that the 5G system bridges. TSN grandmaster clock 280 provides the time that TSN working domain 202 uses.

For supporting TSN time synchronization, the 5G system, also known as 5GS, is integrated with the external systems 202, 250 as a TSN bridge. The 5GS may be considered an institute of electrical and electronics engineers, IEEE, 802.1AS compliant entity. For TSN synchronization, the entire end-to-end 5G system can be considered as a time-aware system, for example an IEEE 802.1AS time-aware system. TSN Translators, TTs, at the edges of the 5G system may be configured to support IEEE 802.1AS operations. UE 230, gNB 220, UPF 260, NW-TT 265 and DS-TTs 240 are synchronized with the 5G system clock 210 which serves to keep these network elements synchronized. The TTs located at the edge of 5G system fulfil functions related to TSN, such as gPTP support, timestamping, Best Master Clock Algorithm (BMCA) and rate ratio.

A precision time protocol, such as gPTP, communication path may comprise a segment of a precision time protocol domain that enables direct communication between two time-aware systems. A precision time protocol may specify the operation of time-aware systems on a bridged packet-switched local area network. A time-aware bridged local area network consists of a number of time-aware systems interconnected by local area networks that support the precision time protocol. A set of time-aware systems that are interconnected by precision time protocol-capable local area networks is called a precision time protocol domain, for example a gPTP domain. There are two types of time-aware systems, a) Time-aware end station, which if not grandmaster, is a recipient of time information, and b) Time-aware bridge, which if not grandmaster, receives time information from the grandmaster. The grandmaster clock is considered as most dependable. Time information may be received indirectly through other time-aware bridges. The non-grandmaster time-aware bridge may apply corrections to compensate for delays in the local area network and the bridge itself, and retransmit the corrected information onward.

Time synchronization in a precision time protocol, such as gPTP, may be conducted by a grandmaster sending information including the current synchronized time to all attached time-aware systems, including systems attached via bridging. Each of these time-aware systems may correct the received synchronized time by adding a propagation time needed for the information to transit the communication path from the grandmaster. If the time-aware system is a time-aware bridge, then it may forward the corrected time information, optionally including additional corrections for delays in the forwarding process, to other attached time-aware systems. Thus the precision time protocol, such as gPTP, may be used to establish a unified time domain comprising systems 250 and 202, via the 5G system acting as bridge.

Thus, in general, precision time protocol messages may comprise a time indication, which is inserted by the grandmaster, and supplementary indications inserted by nodes forwarding the precision time protocol messages, the supplementary indications indicating how long each forwarding has taken, to enable nodes receiving the messages to apply the supplementary indications to the time indication to obtain synchronization.

Figure 2B:
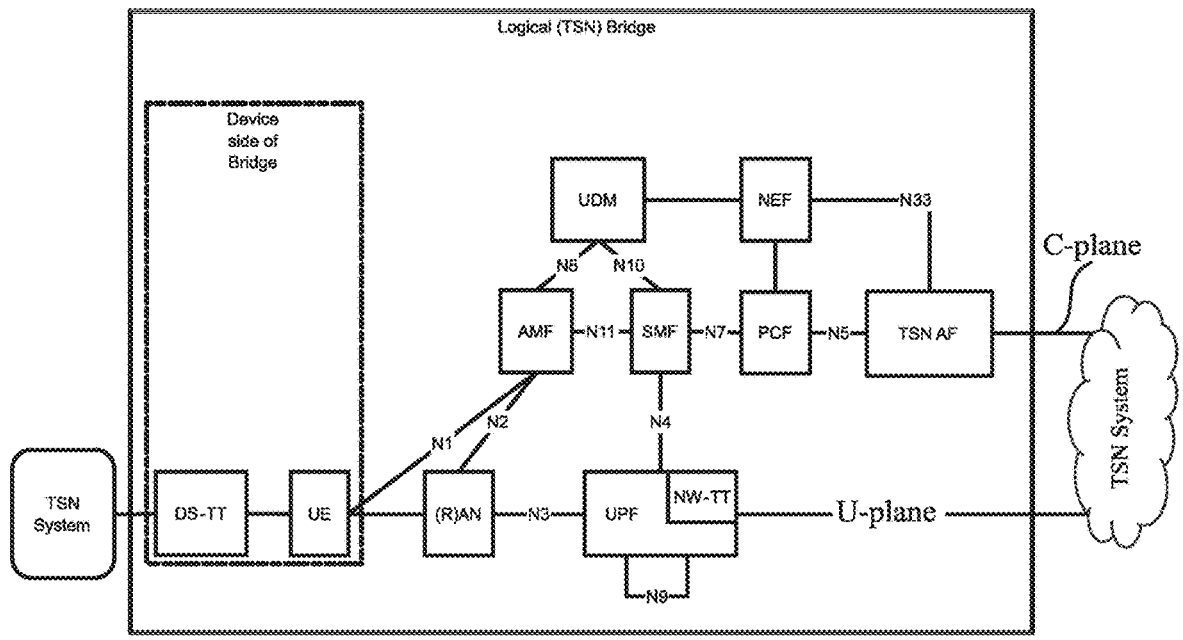
FIG. 2B illustrates an example system in accordance with at least some embodiments of the present invention.

FIG. 2B illustrates an example system in accordance with at least some embodiments of the present invention. The 5G system acts as a logical TSN bridge between the TSN systems on either side. Compared to FIG. 2A, the base station gNB is included in the radio access network (R)AN, and control elements are illustrated. In particular, an access and mobility management function, AMF, a unified data management, UDM, node, a network exposure function, NEF, a policy control function, PCF, a TSN adaptor function, TSN AF, and a session management function, SMF, are illustrated in FIG. 2B. The user plane, U-plane, is bridged over the UPF and RAN, while the control plane is bridged over a TSN AF. FIG. 2B also names interfaces between logical elements, such as N4 between SMF and UPF, and N33 between NEF and TSN AF. In different technologies, or versions of technologies, these interface names may be different from what is illustrated, wherefore these interface names are not limiting on this disclosure.

For time synchronisation needed over 5GS as a bridge in an overall TSN system, the device side TSN translator, DS-TT, and network side TSN translator, NW-TT, may be configured to support a precision time protocol such as the generalized Precision Time Protocol, gPTP, defined in IEEE specifications, such as IEEE 802.1AS. Due to the central relevance of time information for the time sensitive communication, TSC, service in 5GS acting as a bridge in the TSN the transfer of the precision time protocol messages needed for the time synchronisation (e.g. distribution of the 5G system clock or the TSN grandmaster clock, time stamping) in the user plane would benefit from protection as defined by a security policy. This means that for the TSC service, comprising the bridging functionality, the 5GS may be configured to enforce user plane, UP, confidentiality and UP integrity protection when conveying the precision time protocol messages in the user plane. Anti-replay protection may also be required. This implies that at session establishment in the Control Plane the Session Management Function, SMF, must be aware of this enforcement for the corresponding packet data unit, PDU, session, so that it may provide the corresponding security policy to the base station, such as the gNB or gNBs of the radio access network, RAN. The precision time protocol messages treated at the boundaries of the 5GS by the TTs are then transferred transparently in the User Plane of the 5GS in accordance with the security policy.

To initiate the security policy, TSN AF may provide either an explicit trigger to enforce integrity and confidentiality protection in the user plane to transfer the precision time protocol messages securely when TSC service is in use, or the SMF may have a detection mechanism to set a security policy, if security related information is provided by TSN AF. This detection mechanism may comprise detecting that the TSN AF is a sender of a message received in the SMF. The message may relate to initializing the bridge functionality of the 5G system, for example. Either way, the SMF may determine that the security policy is appropriate for the bridge PDU session.

In general, the SMF may be configured to provide session establishment, session modification and/or session release functions. Session establishment may comprise establishment of tunnel connections between UPF and access nodes, such as gNBs. The SMF may provide UP security policy for a PDU session to ng-eNB or gNB during the PDU session establishment procedure. The SMF may determine the TSCAI based on information received from the TSN AF. Consequently the TSN AF may trigger or request the SMF to establish the bridging session between the TSN systems. Examples of PDU session user plane security procedures are described in 3GPP document TS23.501 (version 16.2.0) Chapter 5.10.3. Examples of TSN concepts and processes are described in the same document in Chapters 5.27 and 5.28.

Responsive to determining the security policy is appropriate, the SMF may generate security information for the 5G TSC security policy in the user plane. This may be based on TSN AF-received information. There are at least two alternatives to communicating the generated security information, firstly, the security information may be part of TSC assistance information, TSCAI, or it may be communicated separately. In the first option, TSCAI may comprise a security information field for the information defining the security policy. In the second option, a security information element, distinct from TSCAI may be used. Such an information element may be named TSC security information, TSCSI, for example. The security information defining the security policy may be used as a trigger and provided by the SMF to the gNB for the PDU session used for the transfer of the precision time protocol messages, after the NW-TT has treated the time information they contain. The gNB may responsively apply the security policy for the user plane transport of the precision time protocol messages.

Technical benefits are obtained in that it is assured that NW-TT and DS-TT have the correct time information delivered in precision time protocol, such as gPTP, messages for the bridge PDU session of the 5G system, or of a different system when the system acting as bridge is not specifically a 5G system. Tampering of the time information is prevented, and the timing is not leaked to other sessions present in the bridge system (for example a 5GS), increasing the security level of also the bridged TSN systems, and not only of the bridge system itself.

Figure 3:
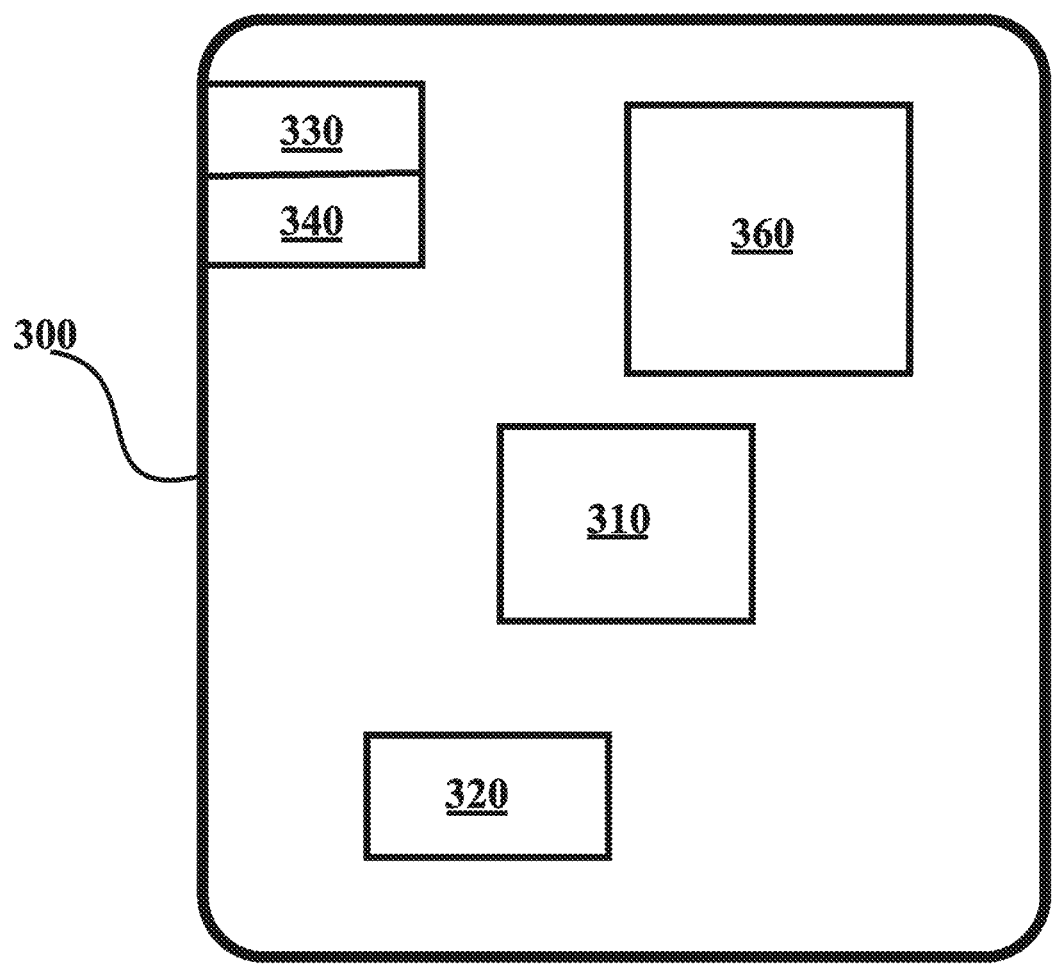
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a network node such as an SMF of FIG. 2B. Comprised in device 300 is processor 310, which may comprise, for example, a single- or multi-core processor wherein a single-core processor comprises one processing core and a multi-core processor comprises more than one processing core.

Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps, such as storing, generating and transmitting, in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example. Transmitter 330 and/or receiver 340 may each be wire-line or at least in part wireless.

Device 300 may comprise user interface, UI, 360. UI 360 may comprise at least one of a display, a keyboard, a touchscreen, a speaker and a microphone. A user may be able to operate device 300 via UI 360, for example to configure security rules.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
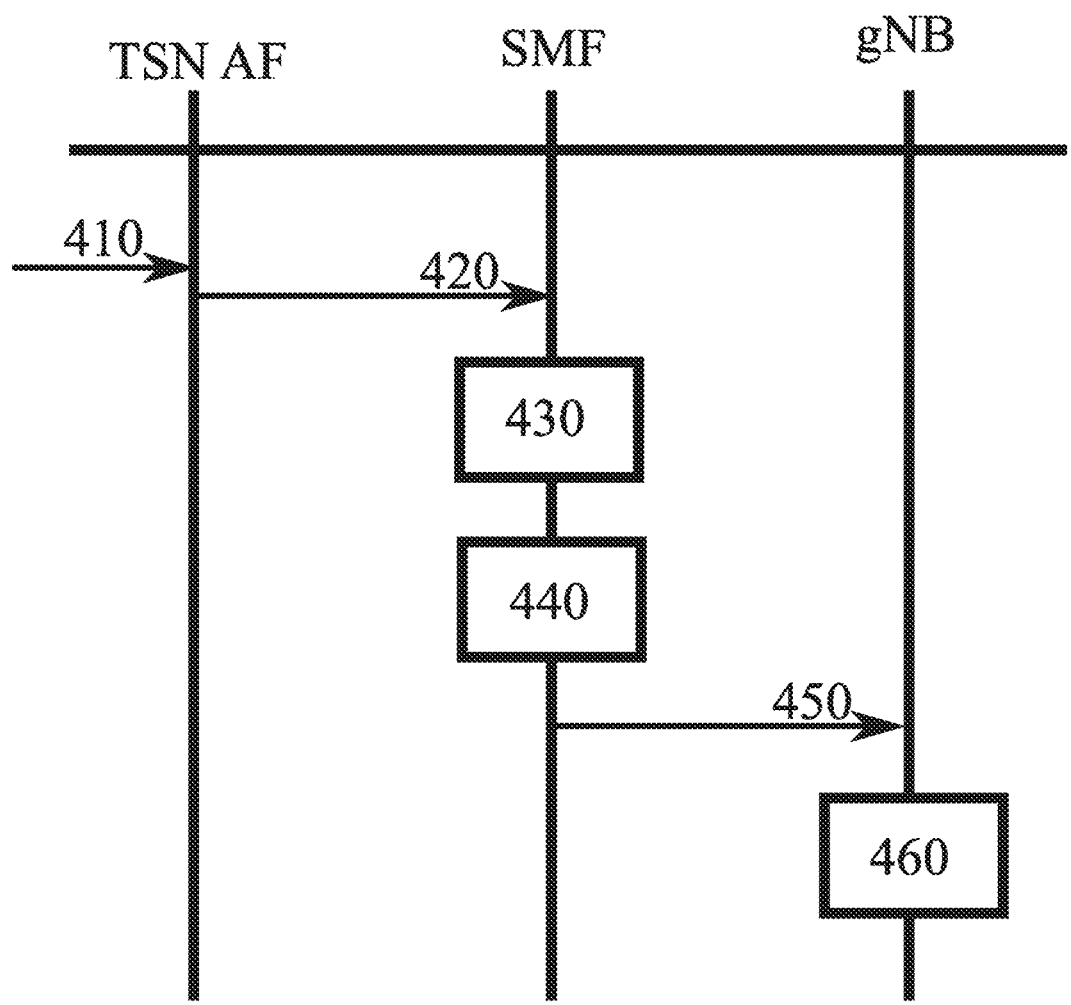
FIG. 4 illustrates signalling in accordance with at least some embodiments of the present invention.

FIG. 4 illustrates signalling in accordance with at least some embodiments of the present invention. On the vertical axes are disposed, on the left, TSN AF, in the centre the SMF, and on the right a gNB, or the RAN in general. Time advances from the top toward the bottom.

In phase 410 the TSN AF receives a prompt, for example a request from a TSN system external to the one where the TSN AF is comprised, to initiate a bridging PDU session over the system in which the TSN AF and the SMF are comprised, to third TSN system. In response, the TSN AF requests the SMF to participate in the set-up of the requested bridging session. This request is illustrated as phase 420 in FIG. 4.

In phase 430, the SMF determines that a security policy should be applied relating to precision time protocol messages, such as gPTP messages, conveyed in the user plane and relating to the bridging PDU session. The determination of phase 430 may be based on an indication comprised in the message(s) of phase 420 to the effect the requested session is a TSN bridging session or explicitly that the security policy is needed, and/or based on a determination the request(s) of phase 420 are received in the SMF from the TSN AF, which is expected to deal with TSN bridging sessions.

In phase 440, the SMF generates security information by defining the security policy. In other words, the security information is an expression of the security policy in a format the system can process. For example, the security policy may require that the precision time protocol messages are integrity protected, confidentiality protected or both integrity and confidentiality protected. As a further example, the security policy may require that the precision time protocol messages are integrity and confidentiality protected as well as anti-replay protected.

In phase 450, the SMF instructs the gNB, or the RAN more generally, to implement the security policy by transmitting the security information to the gNB (or RAN). This message, or messaging, amounts to the SMF initializing the TSC service, wherein the system acts as a bridge between TSN systems. Responsively, in phase 460, the security policy is taken into use by the gNB, or RAN more generally.

Precision time protocol messages may be adapted by NW-TT, the UPF may evaluate their parameters and detect and apply the implemented security policy before transferring the precision time protocol messages toward DS-TT on the user side of the bridge.

Figure 5:
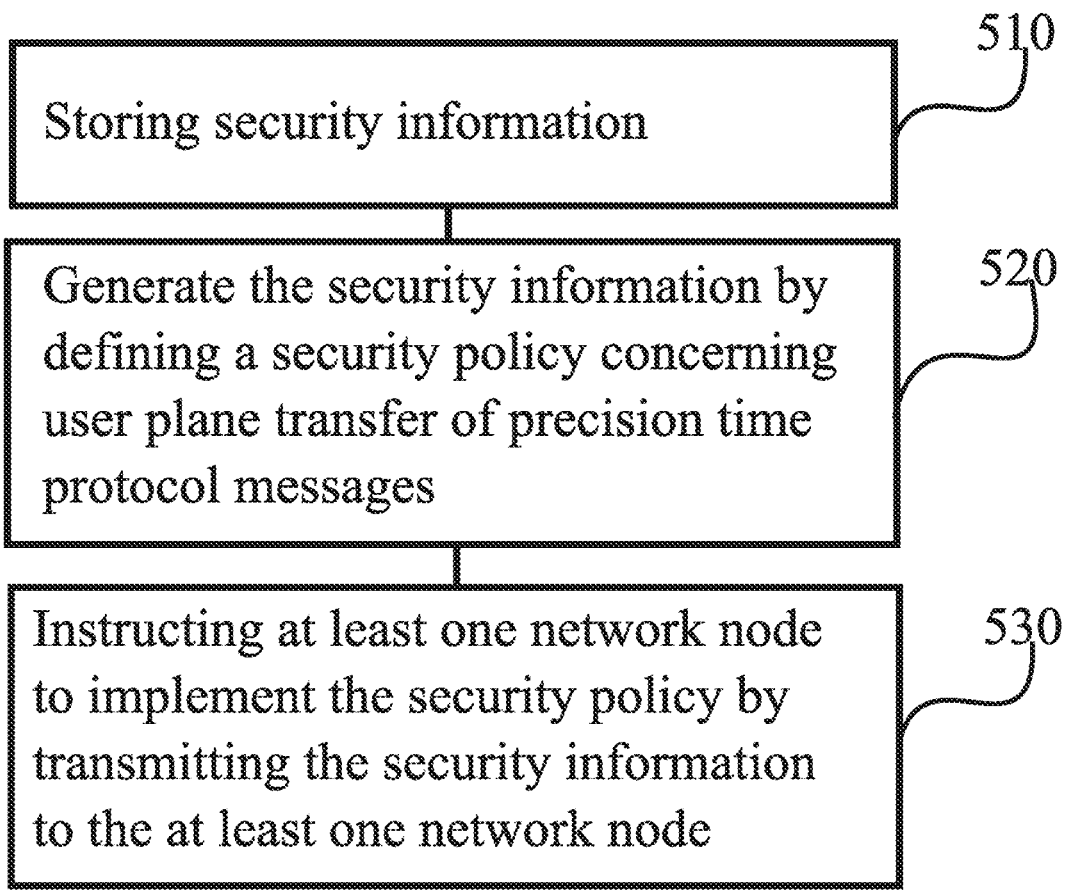
FIG. 5 is a flow graph of a method in accordance with at least some embodiments of the present invention.

FIG. 5 is a flow graph of a method in accordance with at least some embodiments of the present invention. The phases of the illustrated method may be performed in the SMF, an auxiliary device or a personal computer, for example, or in a control device configured to control the functioning thereof, when installed therein.

Phase 510 comprises storing security information. Phase 520 comprises generating the security information by defining a security policy concerning user plane transfer of precision time protocol messages. Finally, phase 530 comprises instructing at least one network node to implement the security policy by transmitting the security information to the at least one network node.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing time-sensitive communication services in communication networks, for example by enforcing a security policy.

ACRONYMS LIST

3GPP 3$^{rd}$ generation partnership project
gPTP generalized precision time protocol
IEEE institute of electrical and electronics engineers
PDU protocol data unit
SMF session management function
TSC time sensitive communication
TSCAI TSC assistance information
TSCSI TSC security information
TSN time sensitive networking
TSN AF TSN adaptor function
TT TSN translator (DS TT: device side TT, NW TT: network side TT)

The invention claimed is:

1. A method in an apparatus, the method comprising:
receiving first information from an external time-sensitive network via a time sensitive network adaptor function included in the apparatus;
determining, using a session management function included in the apparatus, that enforcement of a security policy is to be implemented for user plane transfer of precision time protocol messages for a bridge session;
generating security information, based on the first information, by defining the security policy, the security policy identifying protection policies associated with the user plane transfer of precision time protocol messages;
storing the security information; and
transmitting the security information to at least one network node, the security information enabling the at least one network node to implement the security policy.

2. The method according to claim 1, further comprising:
initializing, using the session management function a time sensitive communication, TSC, service as defined by third generation partnership project.

3. The method according to claim 2, further comprising:
bridging fifth generation cellular communications between two time-sensitive networking elements using the TSC service.

4. The method according to claim 1, wherein the transmitting of the security information is performed in a time sensitive communication assistance information data element.

5. The method according to claim 1, wherein transmitting of the security information is performed in a time sensitive communication security information data element distinct from a time sensitive communication assistance information data element.

6. The method according to claim 1, wherein the generating of the security information is performed as a response to a triggering signal from a time sensitive communication adaptor function.

7. The method according to claim 1, wherein the generating of the security information is performed as a response to a determination, by the apparatus, that a time sensitive communication adaptor function is a sender of a request message received in the apparatus.

8. The method according to claim 1, wherein the security policy comprises at least one of the following requirements for the transfer of precision time protocol messages: integrity protection, confidentiality protection, and/or anti-replay protection.

9. An apparatus comprising:
at least one processor; and
at least one memory including computer program code, the at least one memory and the computer program code configured to, with the at least one processor, cause the apparatus at least to
receive first information from an external time-sensitive network via a time sensitive network adaptor function included in the apparatus;
implement a session management function, the session management function configured to determine that enforcement of a security policy is to be implemented for user plane transfer of precision time protocol messages for a bridge session;
generate security information, based on the first information, by defining the security policy, the security policy identifying protection policies associated with the user plane transfer of precision time protocol messages;
store the security information; and
transmit the security information to at least one network node, the security information enabling the at least one network node to implement the security policy.

10. The apparatus according to claim 9, wherein the session management function is further configured to initialize a time sensitive communication, TSC, service as defined by third generation partnership project.

11. The apparatus according to claim 10, wherein the apparatus is configured to bridge fifth generation cellular communications between two time-sensitive networking elements using the TSC service.

12. The apparatus according to claim 9, wherein the apparatus is configured to perform the transmitting of the security information in a time sensitive communication assistance information, TSCAI, data element.

13. The apparatus according to claim 9, wherein the apparatus is configured to perform the transmitting of the security information in a time sensitive communication security information, TSCI, data element devoid of time sensitive communication assistance information, TSCAI.

14. The apparatus according to claim 9, wherein the apparatus is configured to perform the generating of the security information as a response to a triggering signal from a time sensitive communication adaptor function.

15. The apparatus according to claim 9, wherein the apparatus is configured to perform the generating of the security information as a response to a determination, by the apparatus, that a time sensitive communication adaptor function is a sender of a request message received in the apparatus.

16. The apparatus according to claim 9, wherein the security policy comprises at least one of the following requirements for the transfer of precision time protocol messages: integrity protection, confidentiality protection, and/or anti-replay protection.

17. The apparatus according to claim 9, wherein the apparatus is further configured to transmit the security information in a generalized precision time protocol, gPTP, message in accordance with standards established by the Institute of Electrical and Electronics Engineers, IEEE.

18. A non-transitory computer readable medium having stored thereon a set of computer readable instructions that, when executed by at least one processor, cause an apparatus including the at least one processor to at least:

receive first information from an external time-sensitive network via a time sensitive network adaptor function included in the apparatus;
 implement a session management function, the session management function configured to determine that enforcement of a security policy is to be implemented for user plane transfer of precision time protocol messages for a bridge session;
 generate security information, based on the first information, by defining the security policy, the security policy identifying protection policies associated with user plane transfer of precision time protocol messages;
 store security information; and
 transmit the security information to at least one network node, the security information enabling the at least one network node to implement the security policy.

19. The non-transitory computer readable medium of claim 18, wherein the set of computer readable instruction, when executed by at least one processor, further cause the apparatus including the at least one processor to:
 further configure the session management function to initialize a time sensitive communication, TSC, service as defined by third generation partnership project; and
 bridge fifth generation cellular communications between two time-sensitive networking elements using the TSC service.

20. The non-transitory computer readable medium of claim 18, wherein the set of computer readable instruction, when executed by at least one processor, further cause the apparatus including the at least one processor to:
 transmit the security information in a time sensitive communication assistance information, TSCAI, data element.

* * * * *